April 9, 1968 H. E. RUEHLEMANN ETAL 3,377,514

MICROELECTRONIC CIRCUIT CARRIER

Filed Oct. 22, 1965

4 Sheets-Sheet 1

INVENTORS.
HERBERT E. RUEHLEMANN
FRANK J. FROMPOVICZ

BY

Caesar, Rivise, Bernstein & Cohen

ATTORNEYS.

INVENTORS.
HERBERT E. RUEHLEMANN
FRANK J. FROMPOVICZ

BY Caesar, Rivise, Bernstein & Cohen
ATTORNEYS.

INVENTORS.
HERBERT E. RUEHLEMANN
FRANK J. FROMPOVICZ
BY
Caesar, Rivise, Bernstein & Cohen
ATTORNEYS.

INVENTORS.
HERBERT E. RUEHLEMANN
FRANK J. FROMPOVICZ
BY
Caesar, Rivise, Bernstein & Cohen
ATTORNEYS.

United States Patent Office 3,377,514

Patented Apr. 9, 1968

3,377,514

MICROELECTRONIC CIRCUIT CARRIER

Herbert E. Ruehlmann, Huntingdon Valley, and Frank J. Frompovicz, Cornwell Heights, Pa., assignors to Elco Corporation, Willow Grove, Pa., a corporation of Pennsylvania Filed Oct. 22, 1965, Ser. No. 500,794
18 Claims. (Cl. 317—101)

ABSTRACT OF THE DISCLOSURE

A microelectronic carrier is mechanically and electrically attached to a carrier plate by using a retainer to attach the microelectronic carrier to a holder utilizing a resilient interconnection between the holder and the retainer. The carrier plate is provided with slots which receive tabs on the holder permitting the latter to be moved laterally relative to the carrier plate to misalign the tabs with the slots until a portion of the tabs underlie the lower surface of the carrier plate. Means are provided for maintaining the tabs in misalignment with the slots whereby the microelectronic carrier is securely attached to the carrier plate.

This invention relates to a carrier for microelectronic circuits, and more particularly, to a device which is used as a shipping container, testing board and holder for microelectronic circuits.

Microelectronic circuits, which are also known as integrated circuits, are now widely applied to numerous electronic usages. The common feature that all of these devices possess is that they have reduced large and cumbersome circuits to miniaturization. For a complete discussion of microelectronic circuits, their manufacturers, and a bibliography, attention is called to the Sept. 28, 1964, issue of "Electronic Design" which is entitled, "Microelectronics Data Chart."

It is now a common practice to ship microelectronic circuits in molded plastic containers. Relatively extensive care must be taken in the handling and shipping of these circuits since the wire leads are exposed and unprotected. Damage to a lead will either render the entire circuit ineffective or will necessitate a costly and time-consuming repair. The general practice is to place the circuits into the plastic containers by means of delicate handling devices such as vacuum tweezers or spring tweezers similar to those in general usage. When the circuit has been received by the ultimate user it must be removed from its container and tested. The testing is accomplished by securing temporary leads of testing circuitry onto the leads of the microelectronic circuit or contacting the circuit leads by hand-held testing leads.

The device of this invention greatly facilitates the handling, shipping, and testing of microelectronic circuits. Once the circuit has been placed on the carrier of this invention it can be shipped to the ultimate user and tested by the user while it remains on the carrier. There is no need of providing a separate shipping container. To this extent, the microelectronic circuit carrier possesses the same advantages as that disclosed in co-pending application Serial No. 441,177, filed March 19, 1965, and entitled "Microelectronic Carrier." However, the device of this invention is capable of carrying out a number of additional functions more expeditiously than the device disclosed in the aforementioned co-pending application. Thus, the device of this invention includes a testing board on which any number of individual microelectronic circuits can be secured and readily tested. The removal and replacing of a microelectronic circuit for testing on this board is easily accomplished.

Another feature of this invention is that there is a holder provided for a microelectronic circuit which permits the ready insertion and removal of a microelectronic circuit. This holder is easily locked in place on the testing board for testing of the microelectronic circuit.

Another feature of the holder of this invention is that it can be used for moving the microelectronic circuit from the carrier when it is to be inserted into its ultimate position in an electronic device. Thus, this holder will protect the microelectronic circuit as it is carried from the manufacturer, through his shipping department, to the customer's receiving and incoming inspection department, and through the functional testing and quality control of the circuit by the customer, without any fear of damage to the circuit.

It is therefore an object of this invention to provide a novel microelectronic circuit carrier.

It is another object of this invention to provide a device for the shipping, handling, storing and testing of microelectronic circuits.

It is a further object of this invention to provide a device that protects the leads of a microelectronic circuit whenever the circuit must be transported, tested or otherwise handled.

It is a further object of this invention to provide a microelectronic circuit carrier which permits the ready testing and breadboarding of the microelectronic circuit to prove out circuit configurations.

It is a further object of this invention to provide a carrier for a microelectronic circuit which secures the circuit in place in such a manner as to indicate to the purchaser that the circuit has never been removed from the carrier during its shipment and handling.

These and other objects of this invention are accomplished by providing a carrier for a microelectronic circuit comprising a carrier plate and a holder for said microelectronic circuit secured thereto, said carrier plate including a plurality of slots for the reception of tabs on said holder, said holder adapted to secure said microelectronic circuit therein, said holder having tabs which are adapted to pass through said slots, said tabs being slidable relative to said carrier plate after passing through said slots, whereby said holder is secured to said carrier plate by sliding said tabs out of alignment with said slots.

Other objects and many of the attendant advantages of this invention will be readily appreciated as the same becomes better understood by reference to the following detailed description when considered in connection with the accompanying drawings wherein.

Figure 1:
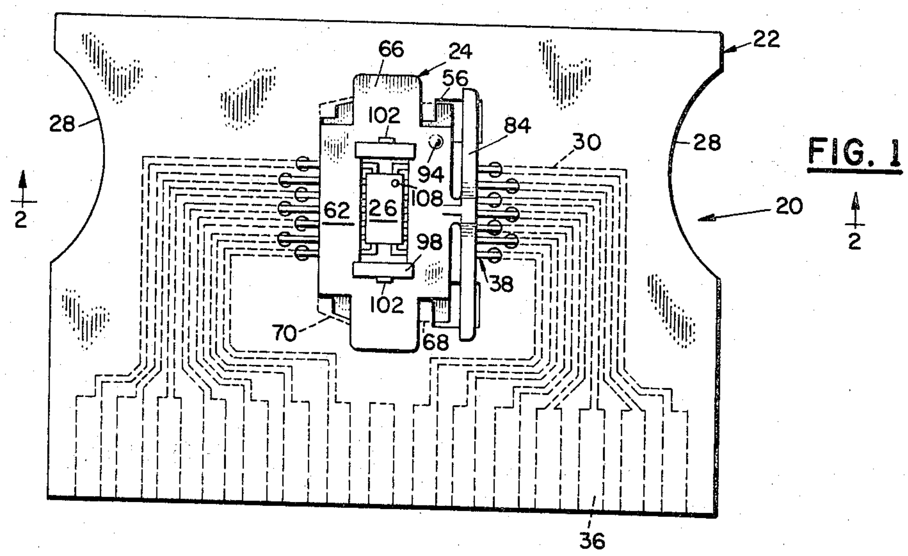
FIG. 1 is a top plan view of the microelectronic circuit carrier of this invention with a microelectronic circuit in place.

Referring now in greater detail to the various figures of the drawings wherein similar reference characters refer to similar parts, a microelectronic circuit carrier embodying the present invention is generally shown at 20 in FIG. 1. Device 20 basically comprises a carrier plate 22 and a microelectronic circuit holder 24. As will be explained more fully hereinafter, carrier plate 22 and holder 24 cooperate in forming a package for the shipment, handling, storing and testing of a microelectronic circuit 26.

Figure 11:
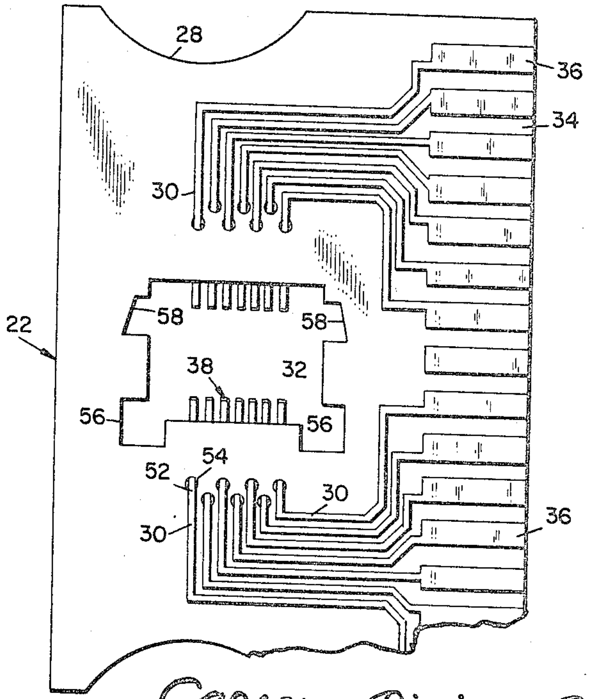
FIG. 11 is a bottom plan view of the carrier plate of this invention.

As best seen in FIGS. 1, 2, 10 and 11, carrier plate 22 is basically rectangular, but includes a recess 28 in each side. The purpose of recesses 28 is to aid in grasping the carrier plate for inserting it and removing it from a card edge connector for testing. As seen in FIG. 11, the underside of carrier plate 22 includes a plurality of spaced printed electrical leads 30, with seven leads in each set. The two sets of leads are spaced on opposite sides of a central opening 32 within the carrier plate 22. Leads 30 terminate at one edge 34 of the carrier plate. At this edge, the leads are expanded to terminate in contact surfaces 36.

Figure 2:
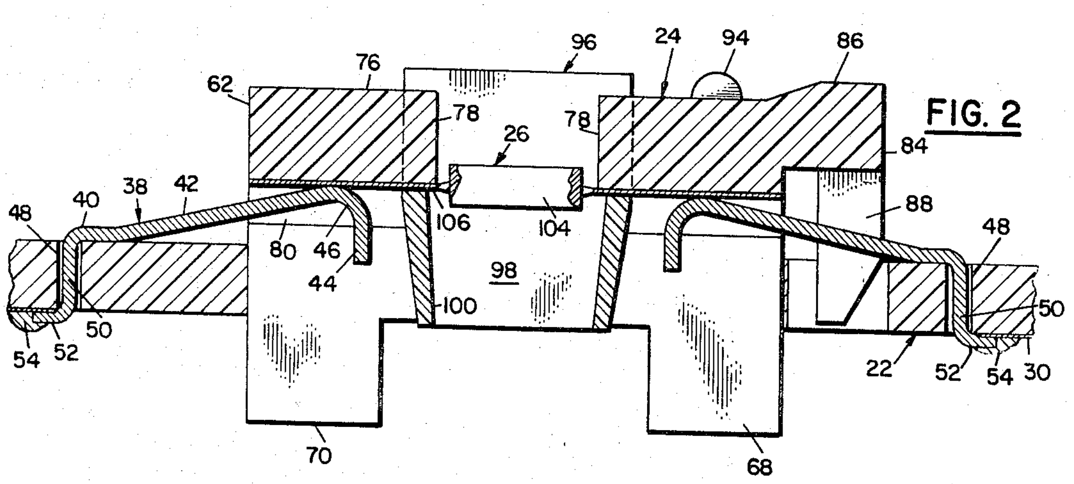
FIG. 2 is an enlarged sectional view taken along the line 2—2 of FIG. 1.
Figure 10:
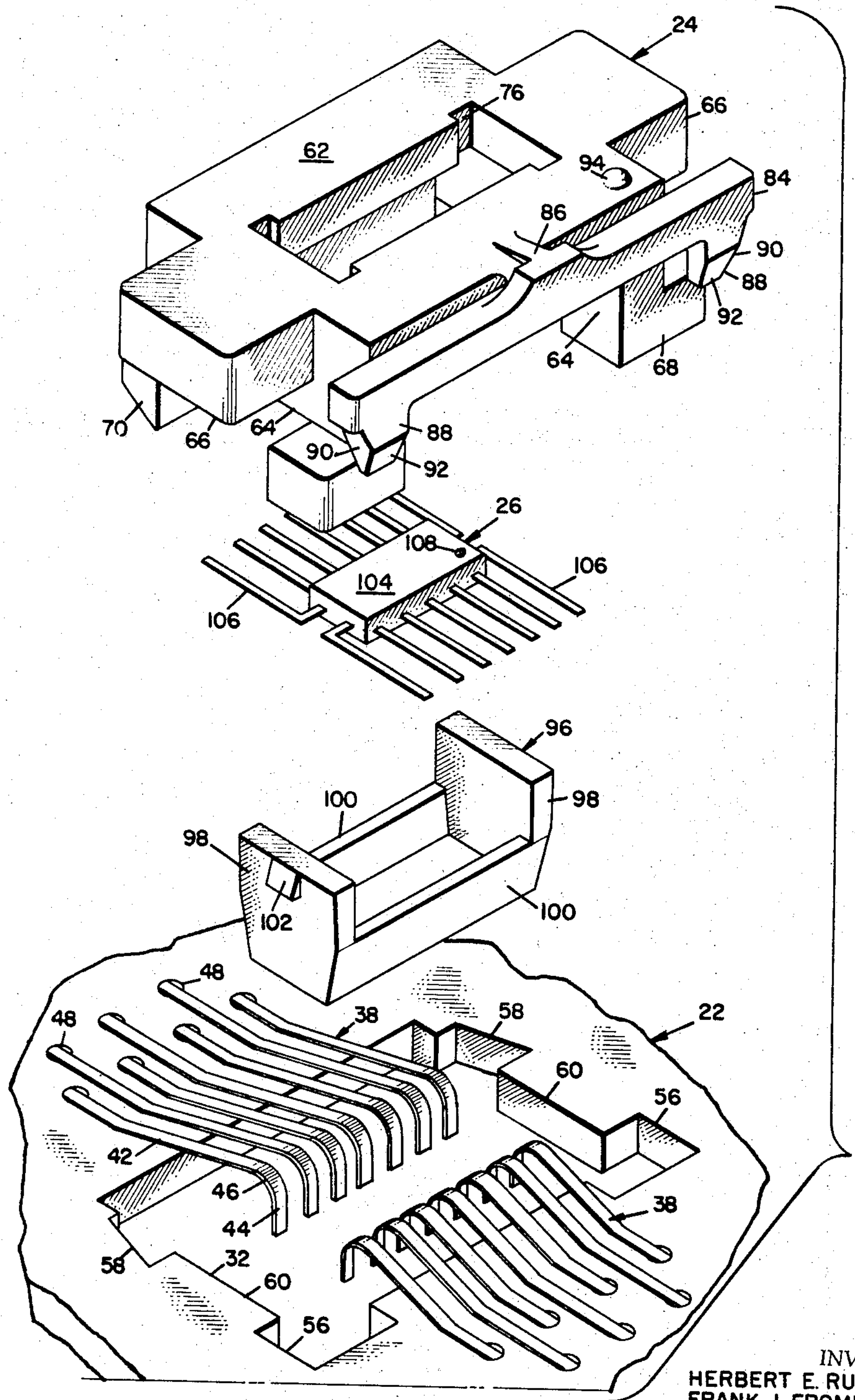
FIG. 10 is an exploded perspective view of the holder and retainer of this invention, a portion of the carrier plate of this invention, and a microelectronic circuit, and taken from the top thereof.

As best seen in FIGS. 2 and 10, the top surface of carrier plate 22 is provided with a plurality of contact fingers 38. There are two sets of fingers 38 with seven fingers in each set. The two sets of fingers are on opposite sides of opening 32 and have portions projecting into the area of the openings. Each finger includes a flattened rear portion 40 (FIG. 2), an upwardly projecting portion 42 which extends into the area of opening 32, and a downwardly bent flange 44. As seen in FIGS. 2 and 10, an arcuate bend 46 joins portion 42 and flange 44.

A plurality of openings 48 (FIG. 2) is formed in carrier plate 22. Each contact finger 38 includes a vertically extending portion 50 (FIG. 2) which passes through an opening 48. A horizontal flange 52 projects from the bottom of portion 50. Each flange 52 is secured to a printed electrical lead 30 in any suitable manner, such as by soldering 54. As best seen in FIG. 10, holes 48 are staggered. The purpose of the staggering is to prevent any inadvertent overlapping when the flanges 52 are soldered to leads 30.

Central opening 32 is shaped to include a first pair of outwardly extending recesses or slots 56 and a second pair of outwardly extending recesses 58. A pair of inwardly extending carrier plate tabs 60 separate recesses 56 and 58. As seen in FIGS. 10 and 11, recesses 56 are basically rectangular whereas recesses 58 include an inwardly tapering outer wall.

Figure 7:
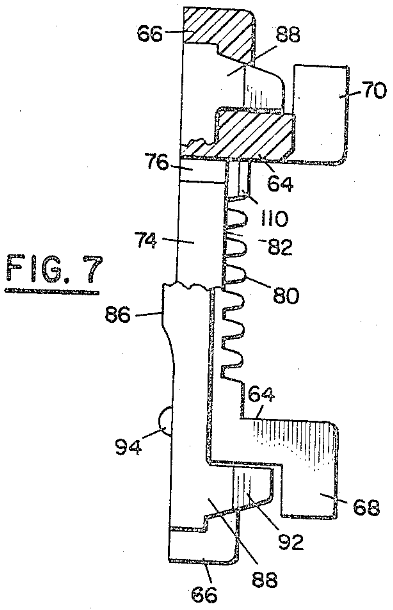
FIG. 7 is a sectional view taken along the line 7—7 of FIG. 6.
Figure 9:
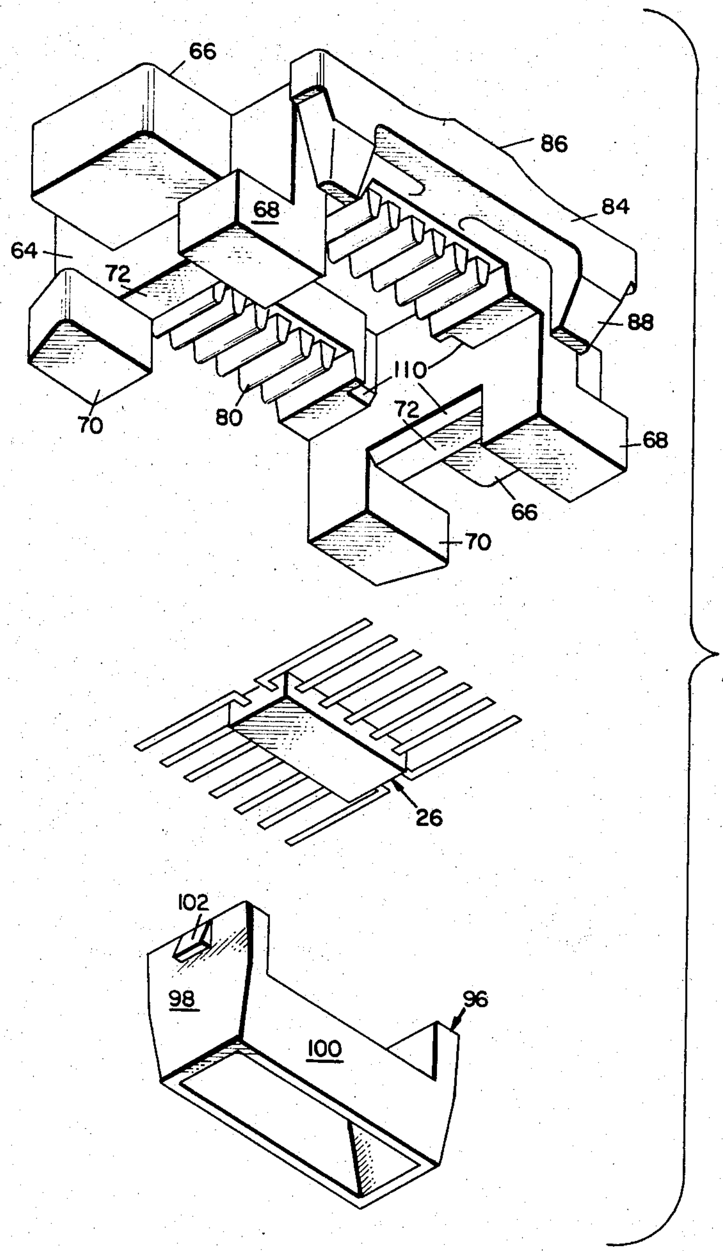
FIG. 9 is an exploded perspective view of the holder and retainer of this invention, and a microelectronic circuit, and taken from the bottom thereof.

Holder 24 basically comprises a plate 62 having dependent end walls 64. An integral boss 66 projects outwardly from each end of plate 62. A first pair of basically rectangular holder tabs 68 projects outwardly from vertical walls 64. A second pair of holder tabs 70 also project outwardly from vertical walls 64. As best seen in FIG. 9, holder tabs 68 and 70 are spaced by a gap 72. As seen in FIG. 7, bosses 66 are parallel to holder tabs 68 and 70 and are vertically spaced therefrom. As will be explained more fully hereinafter, this vertical spacing is slightly greater in dimension than the thickness of carrier plate 22.

Figure 8:
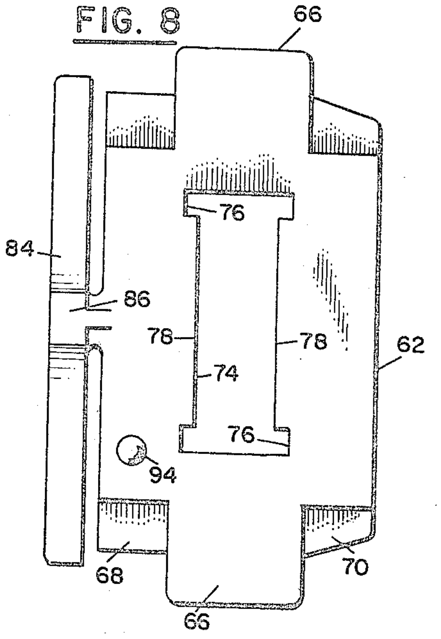
FIG. 8 is a top plan view of the holder of this invention.

As seen in FIG. 8, plate 62 is provided with a substantially central opening 74. Opening 74 is basically rectangular but includes a T-extension 76 at each end. The T-extensions result in a shoulder 78 on each side of opening 74.

Figure 6:
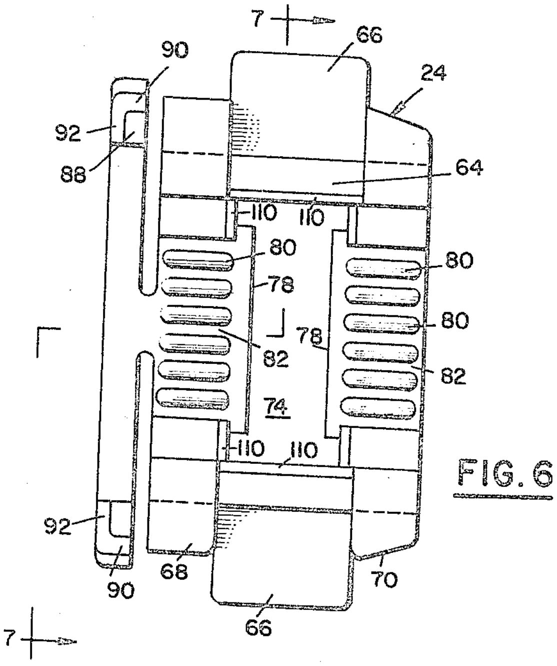
FIG. 6 is a bottom plan view of the holder of this invention.

A plurality of parallel fingers 80 is provided on the undersurface of plate 64. In the embodiment shown there are two sets of fingers 80 with six fingers in each set. The two sets of fingers are on opposite sides of opening 74 and each of the fingers extends perpendicularly with respect to the opening. As seen in FIGS. 6 and 7, fingers

80 divide the undersurface of plate 62 into seven equally spaced recesses 82.

As best seen in FIG. 10, a bar 84 is parallel to plate 62 and is spaced therefrom by rod 86. The bar 84 and rod 86 are integrally formed with the remainder of holder 24. Bar 84 includes a pair of downwardly extending bar tabs 88 at its outer ends. Each bar tab 88 includes bevelled surfaces 90 and 92. Plate 62 is also provided with a nib 94 (FIGS. 7 and 10) at a corner which is adjacent bar 84.

Figure 4:
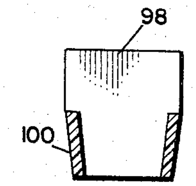
FIG. 4 is a sectional view taken along the line 4—4 of FIG. 3.
Figure 3:
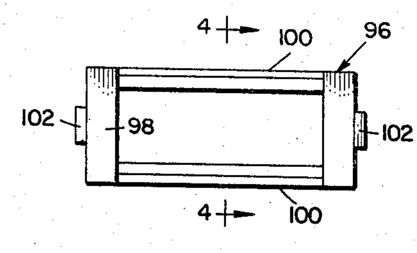
FIG. 3 is a top plan view of the retainer of the holder of this invention.
Figure 5:
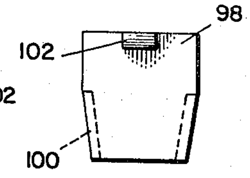
FIG. 5 is a side elevational view of the retainer of FIG. 3.

A retainer 96 is used in conjunction with microelectronic circuit holder 24 and actually forms a part thereof. Retainer 96 comprises a pair of vertical end walls 98 which are joined by a pair of spaced side walls 100. As best seen in FIGS. 4 and 5 the tops of said walls 100 terminate below the tops of vertical walls 98. A lip 102 is formed on the outer surface of each vertical wall 98 adjacent the top thereof. As seen in FIGS. 9 and 10, lips 102 have a tapering outer surface which tapers outwardly in going from its top toward its bottom. Thus, lips 102 are basically triangular in shape.

As seen in FIG. 10, microelectronic circuit 26 basically comprises a body portion 104 and a plurality of equally spaced leads 106 projecting from each side of the body portion. Additionally, body portion 104 includes a depression 108. Depression 108 is used for the orientation of the microelectronic circuit and indicates the polarization position. Other means can be used for indicating this position such as a raised nib or merely a printed dot on the body portion.

The device of this invention is used by first inverting holder 24 to the position shown in FIG. 6 Thereafter, microelectronic circuit 26 is placed on the holder 24 with its leads positioned in recesses 82. In making the insertion, depression 108 is placed adjacent nib 94. With the leads in the recesses, the body 104 of the microelectronic circuit will be received in opening 74 of the holder (FIG. 2). In order to facilitate the insertion of the microelectronic circuit within the holder, all of the walls of the holder surrounding opening 74 are beveled, as shown at 110 in FIG. 6.

After the microelectronic circuit 26 has been inserted as described above, retainer 96 is inserted into the bottom of holder 24. In carrying out this insertion, end walls 98 of the retainer are received in the T-extensions 76 of opening 74. As is apparent from FIG. 1, end walls 98 are spaced a distance which is substantially greater than the length of microelectronic circuit 26. Thus there will be no interference from the microelectronic circuit when the end walls 98 are inserted. During the insertion, side walls 100 are depressed by squeezing them inwardly. As seen in FIG. 2, these side walls are tapered inwardly to aid in grasping them between the thumb and forefinger of the hand. This depression causes the end walls 98 to be drawn closer together, thereby facilitating their entry into T-extension 76. In forcing the end walls 98 into the T-extensions, the side walls will be urged away from the walls of the T-extension by a camming action caused by the T-extension walls against the tapered surface of lips 102 (FIG. 9). After the lips have passed completely through the openings 76, the grip on side walls 100 is released and the retainer 96 will be held firmly in place. The inadvertent removal of the retainer is prevented by the abutment of the under-surfaces of lips 102 on the top of plate 62 (FIG. 1).

As seen in FIG. 2, when the lips 102 are resting on plate 62, the top edges of walls 100 will hold microelectronic circuit leads 106 against shoulders 78. Thus, the combination of the shoulders 78 and the lips 102 serves to securely hold the retainer 96 in place. This in turn maintains microelectronic circuit 26 within holder 24.

The device described above for holding the microelectronic circuit can be used in and of itself for the storage, shipment and testing of the microelectronic circuit. However, in normal usage, the holder will be used to make a complete package with carrier plate 22. The mounting of the holder 24 with the microelectronic circuit 26 secured therein onto carrier plate 22 can best be seen in FIG. 10. Thus, the second pair of holder tabs 70 are placed in recesses 58 and the first pair of holder tabs 68 are placed in recesses 56. As is apparent from FIG. 10, holder tabs 70 have a tapering outer edge. This edge tapers at the same angle as the outer edge of recess 58. The purpose of this configuration is to insure that the holder 24 can be inserted in only one direction into carrier plate 22. By doing this, the polarization lead on the microelectronic circuit will always be positioned at the upper right-hand corner of the assembly, as shown at FIG. 1. As previously pointed out, the polarization lead is indicated on the depression 108 (FIG. 10) on the microelectronic circuit and this depression is aligned with nib 94. In view of the tapering surfaces of holder tabs 70, there is only one position in which the holder 24 can be inserted into the carrier plate 22. Thus, it would be impossible to put the rectangular holder tabs 68 into the tapering recesses 58 in view of the relative sizes.

When inserting the holder into the carrier plate, the holder is held at an acute angle relative to the carrier plate. This is done to permit bar 84 with its dependent bar tabs 88 to be received within recesses 56. The tapering surfaces 90 and 92 on the bar tabs 88 aid in camming the bar 84 in place.

The completed package of the carrier plate 22 and holder 24 is best seen in FIGS. 1 and 2. Thus, once the holder has been completely inserted, the holder tabs 68 and 70 will be pushed forward to have a portion thereof abutting the undersurface of carrier plate 22. Inadvertent removal of the holder is prevented by bar 84 with its dependent bar tabs 88. Thus, as seen in FIG. 2, if there is any lateral movement of the holder 24, the bar tabs 88 will abut the rear wall of recess 56.

With the holder inserted as described above, a resilient finger 38 on the carrier plate 22 will be positioned in each groove 82. As previously pointed out, a lead 106 of microelectronic circuit 26 is also positioned in each groove 82. Therefore, as seen in FIG. 2, the arcuate portion 46 of each contact finger 38 will abut the underside of a microelectronic circuit lead 106. Since the contact fingers 38 are formed of a resilent material, they will resiliently engage the leads 106. Thus, the normal tendency of the fingers 38 is to project above the position shown in FIG. 2. However, these fingers will be depressed when the holder 24 is inserted in the manner described above.

With the completed package formed as shown in FIG. 1, the device with the microelectronic circuit secured therein can be used for the shipment, storage, and testing of the microelectronic circuit. Since the orientation of each of the leads of the circuit is known through the polarity depression and the nib 94, the entire circuit or any portion thereof can be tested through the printed circuit leads 36 adjacent the edge of carrier plate 22. As is apparent, there will be a single printed lead 36 for each of the 14 leads 106 of the microelectronic circuit. The testing can be accomplished by using electrical clamps at any or all of the printed leads 36. Alternatively, the entire carrier plate can be inserted into a card edge connector which is normally used with printed circuits. The recesses 28 facilitate the insertion and removal of the entire carrier plate into and from a card edge connector.

If it is desired to use the microelectronic circuit carrier of this invention for the shipment and positive identification of the microelectronic circuit secured therein, it is possible to form a temporary seal on the entire package. Thus, the entire holder 24 will be made of a thermoplastic resin. With the device assembled as seen in FIGS. 1 and 2, the bar tabs 88 can be fused in order to have them adhere to the walls of recesses 56. Thus the entire device will be heat sealed in place. The only manner in which the device can then be removed would be to sever the bar 84. If the severance takes place prior to reaching the ultimate purchaser of the microelectronic circuit, the purchaser will know that the microelectronic circuit may not be the same as that which was inserted by the factory. Thus, this device can be used for insuring a factory-fresh condition for the microelectronic circuit.

By way of non-limiting example, fingers 80 and grooves 82 can be of approximately the same width. Both the fingers and the grooves are on centers of 0.050 inch. This spacing is preferred because the normal spacing for the leads of a microelectronic circuit is also on 0.050-inch centers. However, it is to be understood that these dimensions and the number of fingers and grooves can be varied in order to accommodate any given microelectronic circuit. The configuration shown is that which would be used for a microelectronic circuit having 14 leads.

The device of this invention also finds utility when used solely as a testing board for microelectronic circuits. Thus, it is a relatively simple matter to remove retainer 96 merely by grasping its side walls 100 between the thumb and forefinger. When this lateral pressure is applied the retainer can be pulled from holder 24. Thereafter, the microelectronic circuit will drop out of place. A new circuit can then be inserted, the retainer replaced, and the combined holder and circuit can be inserted in carrier plate 22 for testing. Once the testing has been completed, it is a relatively simple matter to slide the holder from the carrier plate in a manner opposite to its insertion.

The holder can itself be used for the storage and transporting of the microelectronic circuit after the circuit has been tested. Thus, the leads of the microelectronic circuit are entirely protected when kept within the holder. This will prevent any damage to the microelectronic circuit between the time it is tested and the time it is ultimately used in an electronic device. When it will be ultimately used, the microelectronic circuit is removed from the holder in the manner described above.

The carrier plate 22 can be made of any rigid material generally used for printed circuit boards. Thus it can be cardboard, a molded mixture of an epoxy resin and fiber glass, or any of the thermosetting resins, such as phenolic resins. The printed electrical leads can be placed on the carrier plate by any of the methods known for making printed circuits. Thus the leads can be printed on a separate board which is then laminated to the carrier plate. Alternatively the leads can be placed on a pressure-sensitive adhesive tape which is in turn adhesively laminated to the carrier plate. A third method is to print the electrical leads directly onto the carrier plate.

The fingers 38 can be of any resilient conductive metal. One metal which has been found to be particularly effective for both its conductivity and its resilience is an alloy formed of copper with 1.6% to 1.8% beryllium and other minor elements in an amount up to approximately .15%. Pure copper could also be used. The fingers 38 can be soldered to the printed leads 30 by any of the known techniques such as dip soldering. The reason for staggering the printed leads 30, as shown in FIG. 11, is to prevent any inadvertent solder overlap during the dip soldering.

The holder 24 and retainer 26 are molded from a resilient plastic material. Usually, thermoplastic resins will be used because they possess the desired resiliency. Suitable resins are polyethylene, polypropylene, nylon and polysulfone resins.

The microelectronic circuit can be of any configuration known to the art. The specific circuitry of the microelectronic circuit forms no part of this invention. The device of this invention is adapted for any microelectronic circuit which includes a body and leads. Numerous examples of circuits adapted to miniaturization in microelectronic circuits can be found in the aforementioned September 28, 1964 issue of "Electronic Design."

If desired, the carrier plate can be marked for identification and storage of the microelectronic circuits. Thus various indicia can be etched into the surface of the carrier plate for subsequent identification. Alternatively, labels can be secured to the carrier plate.

Obviously many modifications and variations of the present invention are possible in the light of the above teachings. It is, therefore, to be understood that within the scope of the appended claims, the invention may be practiced otherwise than as specifically described.

What is claimed as the invention is:

1. A carrier for a microelectronic circuit comprising a carrier plate and a holder for said microelectronic circuit secured thereto, said holder being adapted to secure said microelectronic circuit therein, said holder having holder tabs thereon, said carrier plate including a plurality of slots defined by surfaces, said holder tabs extending through said slots and below the plane of the carrier plate, said holder tabs having portions adapted to abut the underside of said carrier plate to secure said holder to said carrier plate when said portions of said holder tabs are misaligned with said slots, and means on said holder for engaging at least one of said surfaces defining one of said slots for sliding said holder relative to said carrier plate after said holder tabs pass through said slots to effect said misalignment.

2. The carrier of claim 1 wherein said carrier plate includes a plurality of electrical contacts on the surface thereof, said contacts being adapted to be electrically connected to leads on said microelectronic circuit.

3. The carrier of claim 2 wherein said electrical contacts comprise a plurality of spaced printed electrical leads on the surface of said carrier plate.

4. The carrier of claim 2 wherein said contacts terminate at an edge of said plate.

5. The carrier of claim 2 wherein said carrier plate additionally includes a plurality of resilient fingers secured thereto, said fingers being electrically conductive and electrically connected to said electrical contacts, said fingers projecting into the area of an opening which includes said slots.

6. The carrier of claim 5 wherein said fingers are adapted to physically contact said microelectronic circuit leads.

7. The carrier of claim 1 wherein two pairs of slots are provided with one pair of said slots being configured differently from the other pair of said slots, said holder having two pairs of tabs, with one pair of holder tabs being configured similarly to one pair of said slots and the other pair of said holder tabs being configured similarly to the other pair of said slots whereby said holder can be inserted into said carrier plate in only one direction.

8. The carrier of claim 1 wherein said holder includes a plurality of recesses therein, said recesses being adapted to receive the leads of said microelectronic circuit.

9. The carrier of claim 1 wherein said holder additionally includes a pair of bosses extending outwardly from the top surface thereof, said bosses being vertically spaced from said holder tabs, whereby said holder will be secured in place on said carrier plate by the abutment of said bosses against the upper surface of said carrier plate and the abutment of said holder tabs against the undersurface of said carrier plate.

10. The carrier of claim 1 and further including a bar projecting outwardly from said holder, said bar having a pair of dependent bar tabs, said dependent tabs being adapted to be received in said slots.

11. The carrier of claim 10 wherein said dependent bar tabs have beveled surfaces to aid in inserting said holder into said carrier plate.

12. A holder for microelectronic circuits comprising a plate, said plate having a pair of vertical depending walls on its ends, at least one pair of holder tabs projecting outwardly from the bottom of said vertical walls, a boss projecting outwardly from the top of each vertical wall, said bosses and holder tabs being vertically spaced, said plate including a central opening adapted to receive the body of said microelectronic circuit with the leads thereof adapted to be received against the under surface of said plate, and a removable retainer including a pair of vertical end walls and a pair of substantially vertical side walls joining the last mentioned end walls adapted to be received in said opening with said side walls adapted to abut said microelectronic circuit leads, said end walls including a pair of outwardly projecting lips adjacent the top thereof, said lips resting on the top surface of said plate.

13. A holder for microelectronic circuits comprising a plate, said plate having a pair of vertical depending walls on its ends, at least one pair of holder tabs projecting outwardly from the bottom of said vertical walls, a boss projecting outwardly from the top of each vertical wall, said bosses and holder tabs being vertically spaced, said plate including a central opening adapted to receive the body of said microelectronic circuit with the leads thereof adapted to be received against the undersurface of said plate, and a removable retainer including a pair of vertical end walls and a pair of substantially vertical side walls joining the last mentioned end walls adapted to be received in said opening with said side walls adapted to abut said microelectronic circuit leads, and a bar projecting outwardly from said plate, said bar including a pair of downwardly extending bar tabs.

14. The holder of claim 13 and further including a second pair of holder tabs projecting outwardly from the bottom of said vertical walls, said second pair of holder tabs being horizontally aligned with said one pair of holder tabs.

15. The holder of claim 14 wherein one pair of holder tabs is configured differently from the other pair of holder tabs.

16. The holder of claim 13 and further including means on the top surface of said plate to indicate the polarity position for said microelectronic circuit held in said holder.

17. The holder of claim 16 wherein said means comprises a nib formed on said plate.

18. The holder of claim 1 wherein said bar tabs include tapered surfaces.

References Cited

UNITED STATES PATENTS

| | | | |
|---|---|---|---|
| D. 202,551 | 10/1965 | Benthuysen | 174—138 |
| 3,011,379 | 12/1961 | Corwin | 317—101 |
| 3,165,672 | 1/1965 | Gellert | 317—101 |
| 3,205,408 | 9/1965 | Boehm et al. | 317—101 |
| 3,271,626 | 9/1966 | Howricka | 317—101 |
| 3,297,974 | 1/1967 | Pittman | 317—101 |
| 3,319,166 | 5/1967 | Coleman | 324—158 |

ROBERT K. SCHAEFER, *Primary Examiner.*

ROBERT S. MACON, *Examiner.*

D. SMITH, *Assistant Examiner.*